(12) United States Patent
Ohtake et al.

(10) Patent No.: US 7,169,364 B2
(45) Date of Patent: Jan. 30, 2007

(54) PARTICULATE FILTER REGENERATING DEVICE

(75) Inventors: Makoto Ohtake, Yokohama (JP);
Jun-ichi Kawashima, Yokosuka (JP);
Naoya Tsutsumoto, Yokohama (JP);
Terunori Kondo, Yokohama (JP);
Takao Inoue, Yokohama (JP);
Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 680 days.

(21) Appl. No.: 10/700,514

(22) Filed: Nov. 5, 2003

(65) Prior Publication Data

US 2004/0123741 A1 Jul. 1, 2004

(30) Foreign Application Priority Data

Dec. 16, 2002 (JP) .............................. 2002-364375

(51) Int. Cl.
*B01D 50/00* (2006.01)
*F01N 3/00* (2006.01)

(52) U.S. Cl. ..................... 422/168; 60/274; 60/285; 60/286; 60/288

(58) Field of Classification Search ................ 422/168; 60/285, 286, 274, 295, 299, 311
See application file for complete search history.

(56) References Cited

U.S. PATENT DOCUMENTS

| | | | |
|---|---|---|---|
| 4,974,414 A | | 12/1990 | Kono et al. |
| 5,287,698 A | * | 2/1994 | Shinzawa et al. ............. 60/286 |
| 5,319,930 A | * | 6/1994 | Shinzawa et al. ............. 60/286 |
| 5,511,413 A | | 4/1996 | Steiner et al. |
| 5,716,586 A | * | 2/1998 | Taniguchi ................... 422/173 |
| 6,497,095 B2 | * | 12/2002 | Carberry et al. .............. 60/295 |
| 6,851,258 B2 | * | 2/2005 | Kawashima et al. .......... 60/311 |
| 6,931,842 B2 | * | 8/2005 | Ohtake et al. ................ 60/295 |
| 6,952,919 B2 | * | 10/2005 | Otake et al. .................. 60/297 |

FOREIGN PATENT DOCUMENTS

| | | |
|---|---|---|
| EP | 1087114 A | 3/2001 |
| FR | 2 774 424 A1 | 8/1999 |
| JP | 07-034853 A | 2/1995 |

* cited by examiner

*Primary Examiner*—Glenn A. Caldarola
*Assistant Examiner*—Tom P. Duong
(74) *Attorney, Agent, or Firm*—Global IP Counselors

(57) ABSTRACT

A particulate filter regenerating device is configured to regenerate a particulate filter that collects particulate from engine exhaust gas. The particulate filter regenerating device is configured to prevent the temperature of the particulate filter from exceeding an allowable temperature during regeneration when the quantity of accumulated particulate is estimated to be lower than it actually is due to variation of the estimate. When the amount of temperature rise per unit time of the particulate filter is larger than a prescribed value during regeneration, it is determined that the temperature of the particulate filter will soon exceed the allowable temperature and the temperature rise amount ΔTexh of the exhaust gas is reduced (ΔTexh1 is the normal temperature rise amount). The larger the temperature rise per unit time is, the more the temperature rise amount of the exhaust gas is reduced.

25 Claims, 7 Drawing Sheets

PARTICULATE FILTER REGENERATING DEVICE

BACKGROUND OF THE INVENTION

1. Field of the Invention

The present invention generally relates to a regenerating device for a particulate filter used to after-treat the exhaust gas of engines, especially diesel engines. The present invention also generally relates to an engine exhaust gas cleaning device that utilizes such a regenerating device.

2. Background Information

Diesel particulate filters are particulate matter collecting devices comprising a honeycomb monolith made of ceramic or the like. Diesel particulate filters are generally used to remove particulate substances (hereinafter called "particulates") from the exhaust gas discharged by diesel engines. During operation, particulates gradually accumulate in the diesel particulate filter. Eventually, the quantity of accumulated particulate matter exceeds an allowed quantity and clogging occurs. Once the particulate filter is clogged, this causes the exhaust pressure to rise and the operation of the engine to be adversely affected. As a result, it is necessary to periodically remove the accumulated particulate matter from the particulate filter so that clogging does not occur.

A known regeneration process for removing particulates from diesel particulate filters is disclosed in Japanese Laid-Open Patent Publication No. 7-034853. The regeneration process of this publication proposes to raise the temperature of the exhaust gas above normal and feed the exhaust gas into the filter, thus heating and combusting the accumulated particulate matter.

One known method for determining if it is time to regenerate a diesel particulate filter is to calculate the pressure difference across the filter by measuring the pressure inside the exhaust passage at the front and rear of the filter and estimate the quantity of accumulated particulate matter based on the calculated pressure difference and the exhaust gas flow rate (which can be calculated based on the intake air flow rate, etc.). When the estimated quantity of accumulated particulate matter reaches a prescribed quantity, the system determines that it is time to regenerate the filter. (See Japanese Laid-Open Patent Publication No. 7-034853)

In view of the above, it will be apparent to those skilled in the art from this disclosure that there exists a need for an improved regenerating device. This invention addresses this need in the art as well as other needs, which will become apparent to those skilled in the art from this disclosure.

SUMMARY OF THE INVENTION

It has been discovered that when the quantity of accumulated particulate matter is estimated based on the pressure difference across the filter and the exhaust gas flow rate, it is easy for variations to occur in the estimate value used for determining if it is time to regenerate the diesel particulate filter. When the estimated quantity of accumulated particulate matter is less than the actual quantity, the following problem occurs.

When the quantity of particulates accumulated in the diesel particulate filter is smaller than the estimated quantity, the amount of heat generated due to combustion of the particulates greatly exceeds the expected amount of heat and a portion of or all of the diesel particulate filter will exceed an allowable temperature. The same problem occurs when other methods are used, such as computing the quantity of particulates discharged from the engine per unit time in accordance with the operating conditions and integrating this quantity to estimate quantity of accumulated particulate matter.

One object of the present invention is to prevent the particulate filter from exceeding the allowable temperature by controlling the exhaust gas temperature, thus protecting the particulate filter, when the estimated quantity of accumulated particulate matter is smaller than the actual quantity due to variation of the estimate value, etc.

The present invention raises the temperature of the exhaust gas in order to regenerate the particulate filter. Meanwhile, it reduces the amount of temperature rise induced in the exhaust gas in order to execute the regeneration when it determines, based on the amount of temperature rise per unit time of the particulate filter, that the heating of the particulate filter is excessive.

With this arrangement, even if the heating of the particulate filter during regeneration becomes excessive due to such factors as the estimated quantity of accumulated particulate matter being less than the actual quantity, the temperature rise of the particulate filter can be restrained by reducing the amount of temperature rise of the exhaust gas and the particulate filter can be prevented from exceeding the allowable temperature.

The present invention also includes the idea of constructing an engine exhaust gas cleaning device that includes such a particulate filter regenerating device.

Basically, in view of the above, the present invention is provided with a particulate filter regenerating device comprising a regeneration timing determining section, an exhaust gas temperature increasing section, an exhaust gas temperature increasing section, and a temperature rise restraining section. The regeneration timing determining section is configured to determine a regeneration timing to regenerate a particulate filter by combusting particulate that has accumulated in the particulate filter;

The exhaust gas temperature increasing section is configured to increase temperature of exhaust gas to regenerate the particulate filter. The temperature rise restraining section is configured to reduce a temperature rise amount of the exhaust gas caused by the exhaust gas temperature increasing section to a lower value based on a temperature of the particulate filter. In particular, the temperature rise restraining section is configured such that at least one of the lower value of the temperature rise amount of the exhaust gas is less than it would be where the temperature of the particulate filter rises comparatively gradually, when the temperature of the particulate filter rises too rapidly during regeneration of the particulate filter by the exhaust gas temperature increasing section, and the lower value of the temperature rise amount of the exhaust gas is below a normal value that is used to bring the particulate filter to a target particulate filter temperature during regeneration.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
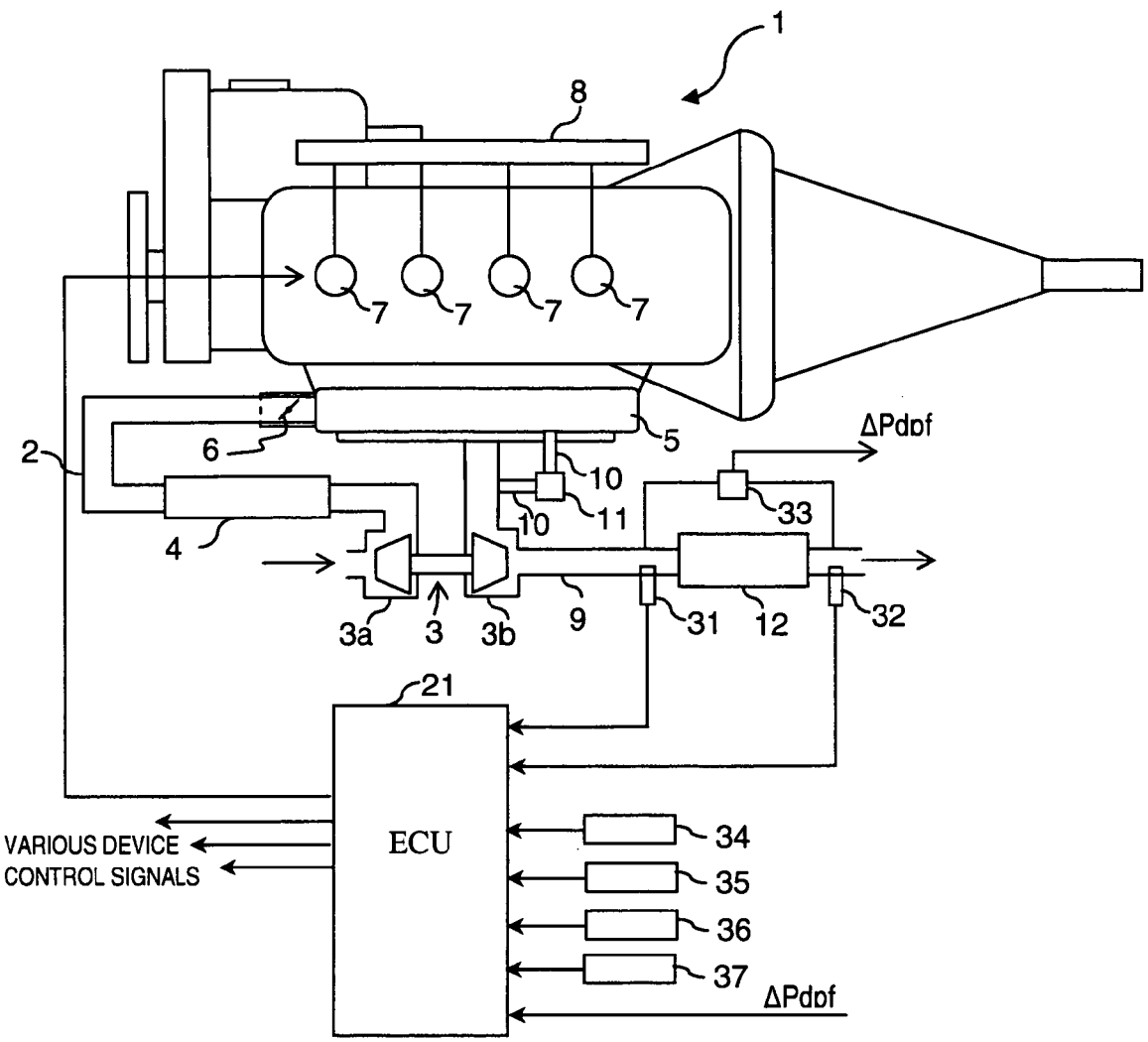
FIG. 1 is a block diagram of a diesel engine in accordance with a preferred embodiment of the present invention.

Referring initially to FIG. 1, a schematic diagram of a direct injection diesel engine 1 is illustrated in accordance with a first embodiment of the present invention. The diesel engine 1 is preferable used in an automobile. The diesel engine 1 is well known in the art. Since diesel engines are well known in the art, the precise structure of the diesel engine 1 will not be discussed or illustrated in detail herein.

An air cleaner (not shown) is installed at the inlet part of the air intake passage 2 to remove dust and particles from intake air to the diesel engine 1. A variable nozzle turbocharger 3 is operatively coupled to diesel engine 1. The turbocharger 3 includes a compressor part 3a installed in the air intake passage 2 downstream of the air cleaner and a turbine part 3b installed in an exhaust passage 9. The intake air that has passed through the air cleaner is compressed by the compressor part 3a and fed onward to an intercooler 4. The intercooler 4 is installed downstream of the compressor part 3a such that the intake air discharged from the compressor part 3a is cooled by the intercooler 4. A throttle valve 6 is installed immediately upstream of a surge tank 5. Thus, the cooled intake air from the intercooler 4 passes through the throttle valve 6 and into the surge tank 5 before being distributed to the individual cylinders at a manifold section of the diesel engine 1.

Regarding the engine main body, the diesel engine 1 includes a cylinder head with a plurality of fuel injectors 7. The fuel injectors 7 are fixed to the cylinder head so as to face the approximate center of the upper part of the combustion chamber of each cylinder. The fuel system of the diesel engine 1 includes a common rail 8. Fuel pumped by a fuel pump (not shown) is delivered to the injectors 7 through the common rail 8 in a conventional manner. The injectors 7 operate in response to a fuel injection signal sent from an electronic control unit or "ECU" 21. The injectors 7 are configured and arranged to execute fuel injections in several stages. In addition to the main injection that serves to control the torque of the diesel engine 1, the injectors 7 perform a pilot injection for reducing the quantity of particulates generated and a post injection for increasing the temperature of the exhaust gas when the diesel particulate filter 12 is being regenerated. The pilot injection is performed at a more advanced timing than the main injection and the post injection is performed at a more retarded timing than the main injection.

Meanwhile, the turbine part 3b of the turbocharger 3 is installed downstream of the manifold section in the exhaust passage 9. The turbine part 3b of the turbocharger 3 has movable vanes in which the vane angles of the movable vanes are controlled in accordance with the operating conditions by a supercharging pressure control signal from the electronic control unit 21.

The diesel particulate filter 12 is installed downstream of the turbine part 3b to after-treat the exhaust gas. The particulates in the exhaust gas are removed from the exhaust gas as the exhaust gas passes through the diesel particulate filter 12. An EGR pipe 10 for recirculating exhaust gas (EGR) is connected between the exhaust passage 9 and the air intake passage 2 (i.e., the surge tank 5 in this embodiment) and an EGR control valve 11 is installed in the EGR pipe 10. An appropriate amount of exhaust gas is recirculated to the air intake passage 2 in accordance with the opening degree of the EGR control valve 11, which operates in response to an EGR control signal from the electronic control unit 21.

The exhaust gas cleaning device of the diesel engine 1 in this embodiment includes the diesel particulate filter 12 and the regenerating device, which comprises the electronic control unit 21 and sensors 31–37 as discussed below. The diesel particulate filter 12 has a honeycomb monolith made of ceramic or the like. The basic structure of the diesel particulate filter 12 is well known in the art. Since diesel particulate filters are well known in the art, the precise structure of the diesel particulate filter 12 will not be discussed or illustrated in detail herein.

The electronic control unit 21 preferably includes a microcomputer with a regenerative particulate filter control program that controls the fuel injectors as discussed below. The electronic control unit 21 can also include other conventional components such as an input interface circuit, an output interface circuit, and storage devices such as a ROM (Read Only Memory) device and a RAM (Random Access Memory) device. The microcomputer of the electronic control unit 21 is programmed to control the regeneration of the particulate filter 12. The memory circuit stores processing results and control programs are run by the processor circuit. The electronic control unit 21 is operatively coupled to the sensors 31–37 in a conventional manner. The internal RAM of the electronic control unit 21 stores statuses of operational flags and various control data. The internal ROM of the electronic control unit 21 stores various operations as needed and/or desired. It will be apparent to those skilled in the art from this disclosure that the precise structure and algorithms for electronic control unit 21 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The sensors 31–37 of the regenerating device send signals to the electronic control unit 21 for the purpose of regenerating the diesel particulate filter 12. The exhaust gas temperature sensors 31 and 32 are configured and arranged to detect the exhaust gas temperatures Texhin and Texhout at the inlet and outlet, respectively, of the diesel particulate filter 12. The exhaust gas temperature sensor 31 is configured and arranged to produce a signal indicative of the exhaust gas temperature Texhin at the inlet of the diesel particulate filter 12 that is sent to the electronic control unit 21. The exhaust gas temperature sensor 32 is configured and arranged to produce a signal indicative of the exhaust gas temperature Texhout at the outlet of the diesel particulate filter 12 that is sent to the electronic control unit 21.

The filter pressure difference sensor 33 is configured and arranged to detect the pressure difference (hereinafter called "filter pressure difference") ΔPdpf across the diesel particulate filter 12. The filter pressure difference sensor 33 is configured to produce a signal indicative of the filter pressure difference that is sent to the electronic control unit 21.

The air flow meter 34 is configured and arranged to detect air flow of in the air intake passage 2. The air flow meter 34 is configured to produce a signal indicative of the intake air flow rate of the air intake passage 2 that is sent to the electronic control unit 21.

The crank angle sensor 35 is configured and arranged to detect the crank angle of the crank shaft of the diesel engine 1. The crank angle sensor 35 is configured to produce a signal indicative of the crank angle that is sent to the electronic control unit 21.

The accelerator position sensor 36 is configured and arranged to detect the depression amount of the accelerator pedal. The accelerator position sensor 36 is configured to produce a signal indicative of the depression amount of the accelerator pedal that is sent to the electronic control unit 21.

The throttle opening degree sensor 37 is configured and arranged to detect throttle opening degree of the throttle valve 6. The throttle opening degree sensor 37 is configured to produce a signal indicative of the throttle opening degree that is sent to the electronic control unit 21.

Figure 4:
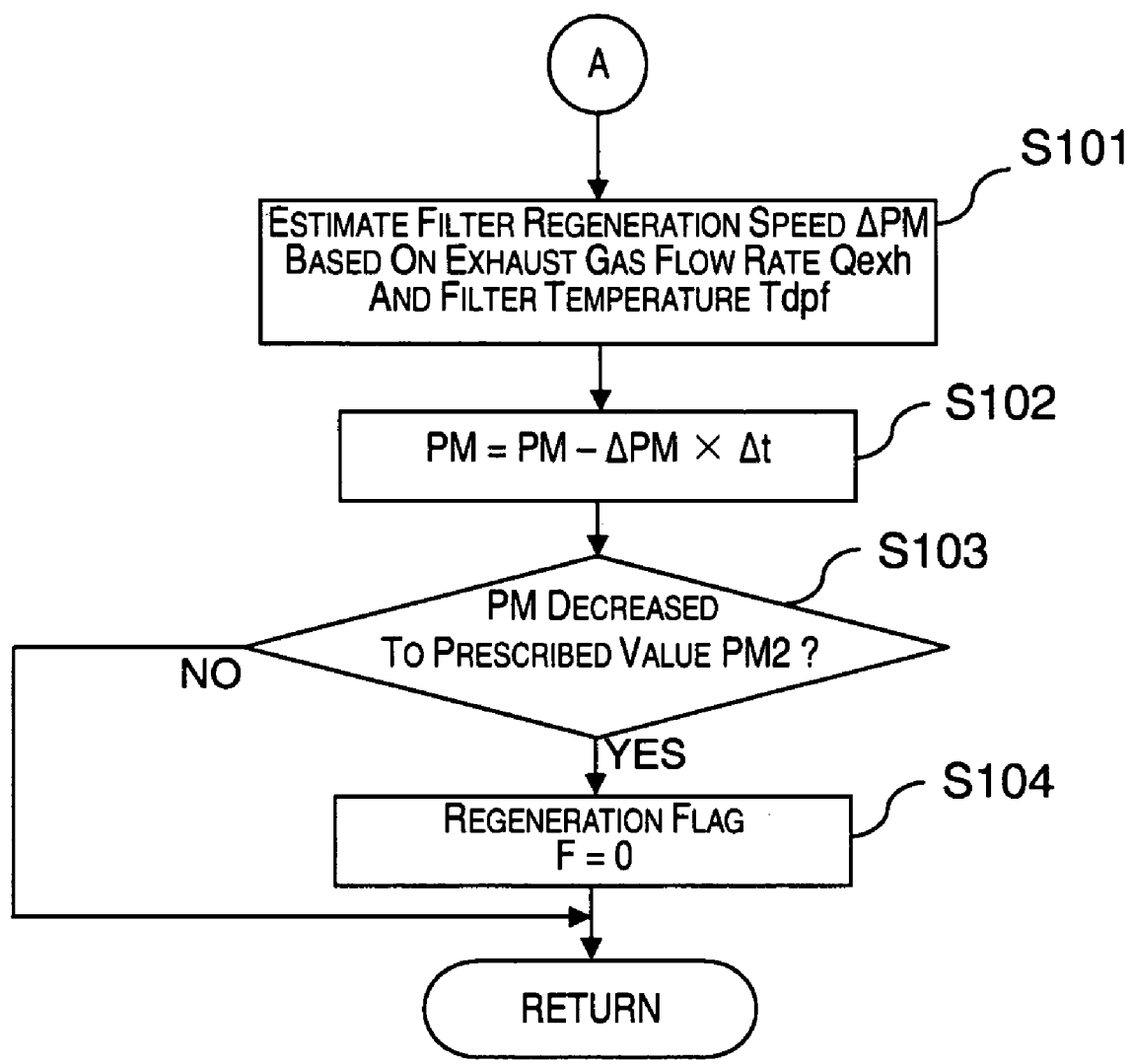
FIG. 4 is a continuance of the flowchart shown in FIG. 2.

The operation of the electronic control unit 21 in relation to the regeneration of the diesel particulate filter 12 will now be described with reference to the flowcharts of FIGS. 2 and 4. First, in step S1 and S2 of the flowchart shown in FIG. 2, the electronic control unit 21 determines the regenerate timing of the diesel particulate filter 12, i.e., if it is time to regenerate the diesel particulate filter 12. If it is time to regenerate the diesel particulate filter 12, then the electronic control unit 21 proceeds to step S5 to start the regeneration of the diesel particulate filter 12. Steps S1 and S2 constitute the regeneration timing determining section.

In step S1, the electronic control unit 21 reads in the filter pressure difference ΔPdpf and the exhaust gas flow rate Qexh. Based on the detected values of the filter pressure difference ΔPdpf and the exhaust gas flow rate Qexh, the electronic control unit 21 estimates the accumulated particulate quantity PM, i.e., the quantity of particulates accumulated in the diesel particulate filter 12. The accumulated particulate quantity PM is estimated by referring to a map in which the accumulated particulate quantity PM values are allocated in accordance with the filter pressure difference ΔPdpf and the exhaust gas flow rate Qexh. The exhaust gas flow rate Qexh is preferably calculated by the electronic control unit 21 based on the intake air flow rate Qa that is detected by the air flow meter 34.

In step S2, the electronic control unit 21 checks if the regeneration flag F is 0. If the regeneration flag is determined by the electronic control unit 21 to be 0, the electronic control unit 21 proceeds to step S3. If the regeneration flag is not determined by the electronic control unit 21 to be 0, the electronic control unit 21 proceeds to step S4. The regeneration flag F is set to 0 when the engine is started. The regeneration flag F is set to 1 when it is time to regenerate the diesel particulate filter 12.

In step S3, the electronic control unit 21 determines if the accumulated particulate quantity PM has reached a prescribed value PM1 that is established in advance as a value indicating the maximum allowable accumulation of particulates. The electronic control unit 21 then proceeds to step S4 if the electronic control unit 21 determines that the prescribed value PM1 has been reached. The electronic control unit 21 proceeds to step S11 if it determines that prescribed value PM1 has not been reached. In step S4, the electronic control unit 21 sets the regeneration flag F to 1.

When the electronic control unit 21 determines that it is time to regenerate the diesel particulate filter 12, the electronic control unit 21 sets a device control quantity increasing/decreasing value dCONT for the devices (hereinafter called "regeneration control devices") that are controlled to raise the temperature of the exhaust gas (step S5).

The regeneration control devices of this embodiment include the injectors 7, the turbocharger 3, the EGR control valve 11, and the intake air throttle valve 6. By setting the value dCONT, at least one of the following quantities is adjusted: the main injection timing of the injectors 7; the post injection timing of the injectors 7; the post injection quantity of the injectors 7; the vane angle of the turbocharger 3; the opening degree of the EGR control valve 11; and the opening degree of the intake air throttle valve 6.

As seen below, the table shows the dCONT items and descriptions of how the regeneration control devices are controlled by the electronic control unit 21 when the temperature of the exhaust gas is raised.

TABLE 1

| Device | dCONT | Control Description |
| --- | --- | --- |
| Injectors | Main injection timing | Retarded |
|  | Post injection timing | Retarded |
|  | Post injection quantity | Increased |
| Turbocharger | Supercharging pressure | Reduced |
| EGR control valve | Opening degree | Closed |
| Intake air throttle valve | Opening degree | Closed |

The device control quantity increasing/decreasing value dCONT is set as a value used to increase or decrease the device control quantity base value CONT. The device control quantity increasing/decreasing value dCONT is read from a map that allocates the value dCONT in accordance with the operating conditions (e.g., fuel injection quantity Tp and engine rotational speed Ne). The regeneration control devices (sometimes a single device, sometimes a plurality of devices) with respect to which the value dCONT is set differently depending on the operating conditions. In order to obtain the exhaust gas temperature required to bring the accumulated particulate matter to the prescribed combustion temperature, the value dCONT is set with respect to one or a plurality of regeneration control devices in accordance with the operating conditions. Steps S5 to S10 (discussed later) comprise the exhaust gas temperature increasing section.

Next, in steps S6 to S8, the electronic control unit 21 determines if the heating of the diesel particulate filter 12 during regeneration is excessive. If the heating is determined to be excessive, the electronic control unit 21 proceeds to step S9 where it executes control to restrain the temperature rise of the diesel particulate filter 12.

In step S6, the electronic control unit 21 reads in the exhaust gas temperatures Texhin and Texhout at the inlet and outlet of the diesel particulate filter 12 and uses the average of these temperatures to calculate the temperature Tdpf (=k×(Texhin+Texhout)/2, where k is a coefficient) of the diesel particulate filter 12 (hereinafter called "filter temperature").

In step S7, the electronic control unit 21 calculates the rise per unit time of the filter temperature Tdpf (hereinafter called the "filter temperature rise rate" and given by $\Delta Tdpf = (Tdpf - Tdpf_{-1})/\Delta t$, where $Tdpf_{-1}$ is value of Tdpf in the previous control cycle and $\Delta t$ is the period of the control cycle).

In step S8, the electronic control unit 21 determines if $\Delta Tdpf$ is greater than or equal to a prescribed value $\Delta T1$, which is set in advance as a value indicating that the heating of the diesel particulate filter 12 is excessive. If it determines that the filter temperature rise rate is greater than or equal to $\Delta T1$, the electronic control unit 21 proceeds to step S9. If the filter temperature rise rate is less than $\Delta T1$, the electronic control unit 21 proceeds to step S101 of the flowchart shown in FIG. 4.

Figure 3:
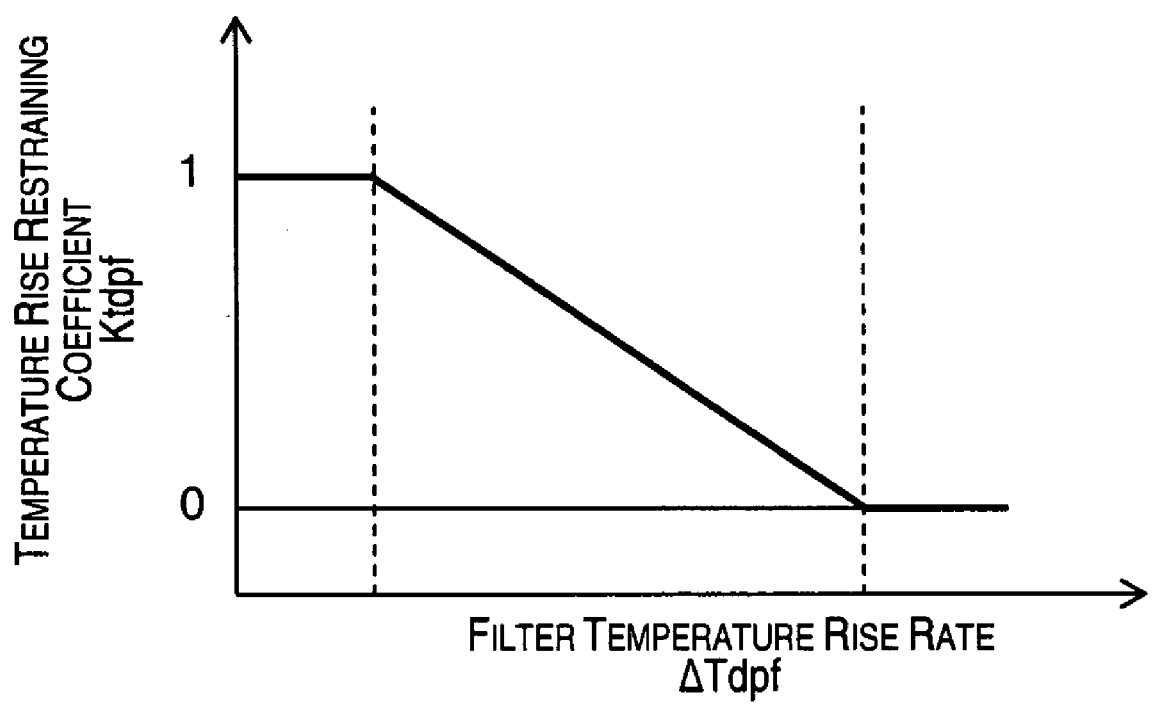
FIG. 3 shows the relationship between the temperature rise restraining coefficient and the filter temperature rise rate during the aforementioned regeneration control in accordance with the present invention.

In step S9, the electronic control unit 21 sets a temperature rise restraining coefficient Ktdpf ($0 \leq Ktdpf < 1$) for restraining the rise in temperature of the diesel particulate filter 12. The temperature rise restraining coefficient Ktdpf is multiplied by the device control quantity increasing/decreasing value dCONT (dCONT=dCONT×Ktdpf). The coefficient Ktdpf is set separately for each regeneration control device. For all regeneration control devices, the larger the filter temperature rise rate $\Delta Tdpf$ is the smaller the value to which the coefficient is set (see FIG. 3). Steps S6 to S9 constitute the temperature rise restraining section.

In step S10 the device control quantity increasing/decreasing value dCONT is added to the device control quantity base value CONT to determine the final device control quantity CONT (=CONT+dCONT). In addition to combusting the particulates accumulated in the diesel particulate filter 12, the electronic control unit 21 determines if regeneration has finished by executing the steps of the flowchart shown in FIG. 4.

In step S101, the electronic control unit 21 reads in the exhaust gas flow rate Qexh and the filter temperature Tdpf and, based on the exhaust gas flow rate Qexh and the filter temperature Tdpf, estimates the regeneration speed $\Delta PM$ (hereinafter called "filter regeneration speed" and indicating the quantity of particulates combusted per unit time) of the diesel particulate filter 12. The estimation of the exhaust gas flow rate $\Delta PM$ is accomplished by referring to a map that allocates the exhaust gas flow rate $\Delta PM$ in accordance the exhaust gas flow rate Qexh and the filter temperature Tdpf.

In step S102, the electronic control unit 21 subtracts the quantity of particulates removed by combustion from the accumulated particulate quantity PM estimated in step S1 to calculate the remaining particulate quantity PM (=PM−$\Delta PM \times \Delta t$, where $\Delta t$ is the period of the control cycle).

In step S103, the electronic control unit 21 determines if the accumulated particulate quantity PM has decreased to a prescribed value PM2 (<PM1) that is set in advance as a value indicating that the particulates have been completely removed. If it determines that the prescribed value PM2 has been reached, the electronic control unit 21 proceeds to step S104. If the electronic control unit 21 determines that the prescribed value PM2 has not been reached, the electronic control unit 21 returns to the main routine. In step S204, the electronic control unit 21 sets the regeneration flag to 0 and lowers the exhaust gas temperature to a normal temperature by executing the subsequent processing.

Figure 2:
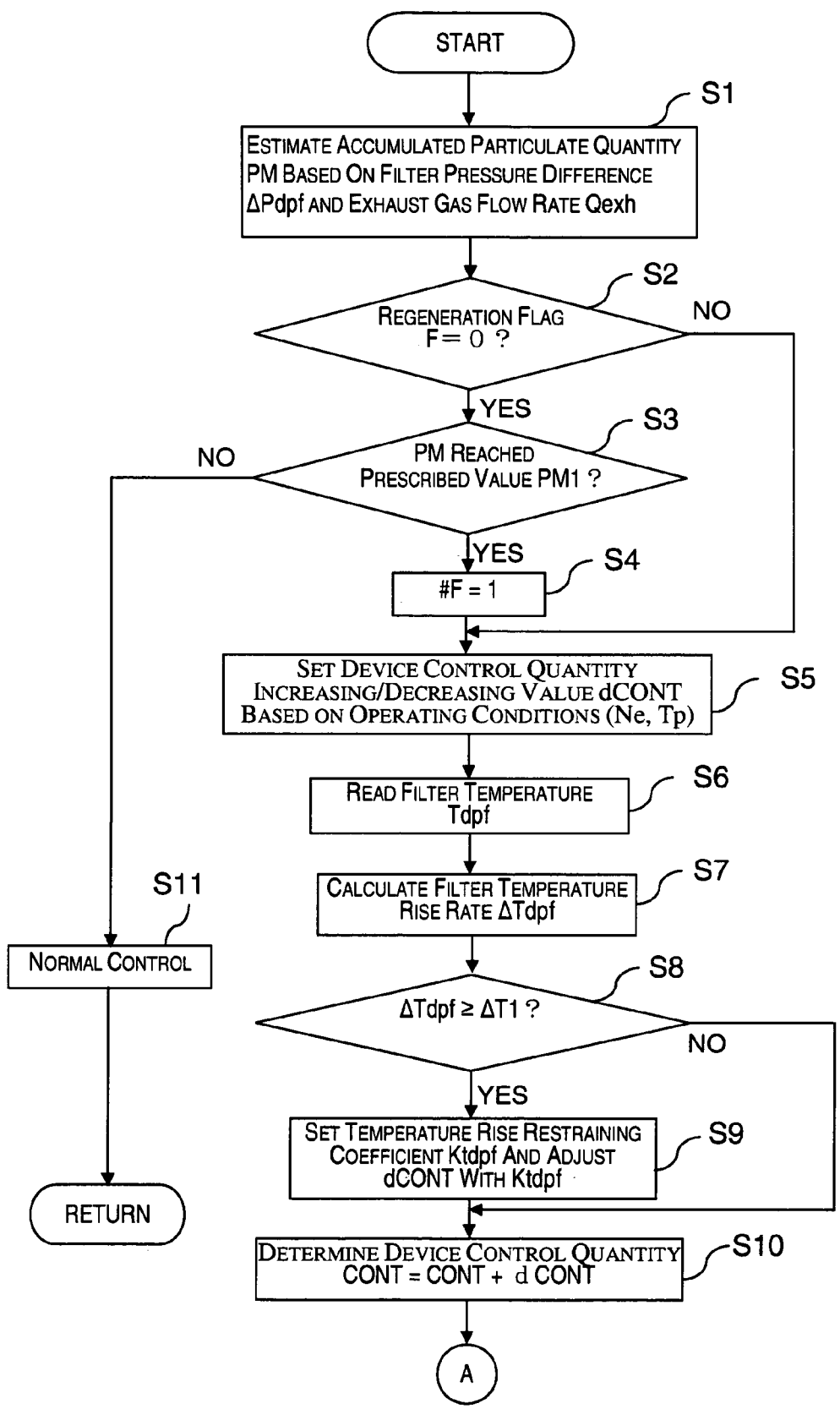
FIG. 2 is a flowchart showing regeneration control for a diesel particulate filter used in the diesel engine illustrated in FIG. 1 in accordance with the present invention.

When it determines that the accumulated particulate quantity PM has not reached the prescribed value PM1 in step S3 of the flowchart shown in FIG. 2, the electronic control unit 21 proceeds to step S11 and executes normal engine control. When this occurs, the device control quantity base value CONT is used without modification as the device control quantity.

This embodiment preferably enables the following effects to be obtained.

When the filter temperature rise rate $\Delta Tdpf$ is greater than or equal to the prescribed value $\Delta T1$ during regeneration of the diesel particulate filter 12, the electronic control unit 21 sets a temperature rise restraining coefficient Ktdpf to decrease the amount of temperature rise of the exhaust gas. As a result, even if the heating of the diesel particulate filter 12 becomes excessive due to the estimated accumulated particulate quantity PM being less than the actual quantity, the rise in the temperature of the diesel particulate filter 12 is restrained by reducing the amount of rise in the temperature of the exhaust gas and the temperature of the diesel particulate filter 12 can be prevented from exceeding the allowable temperature.

Figure 5:
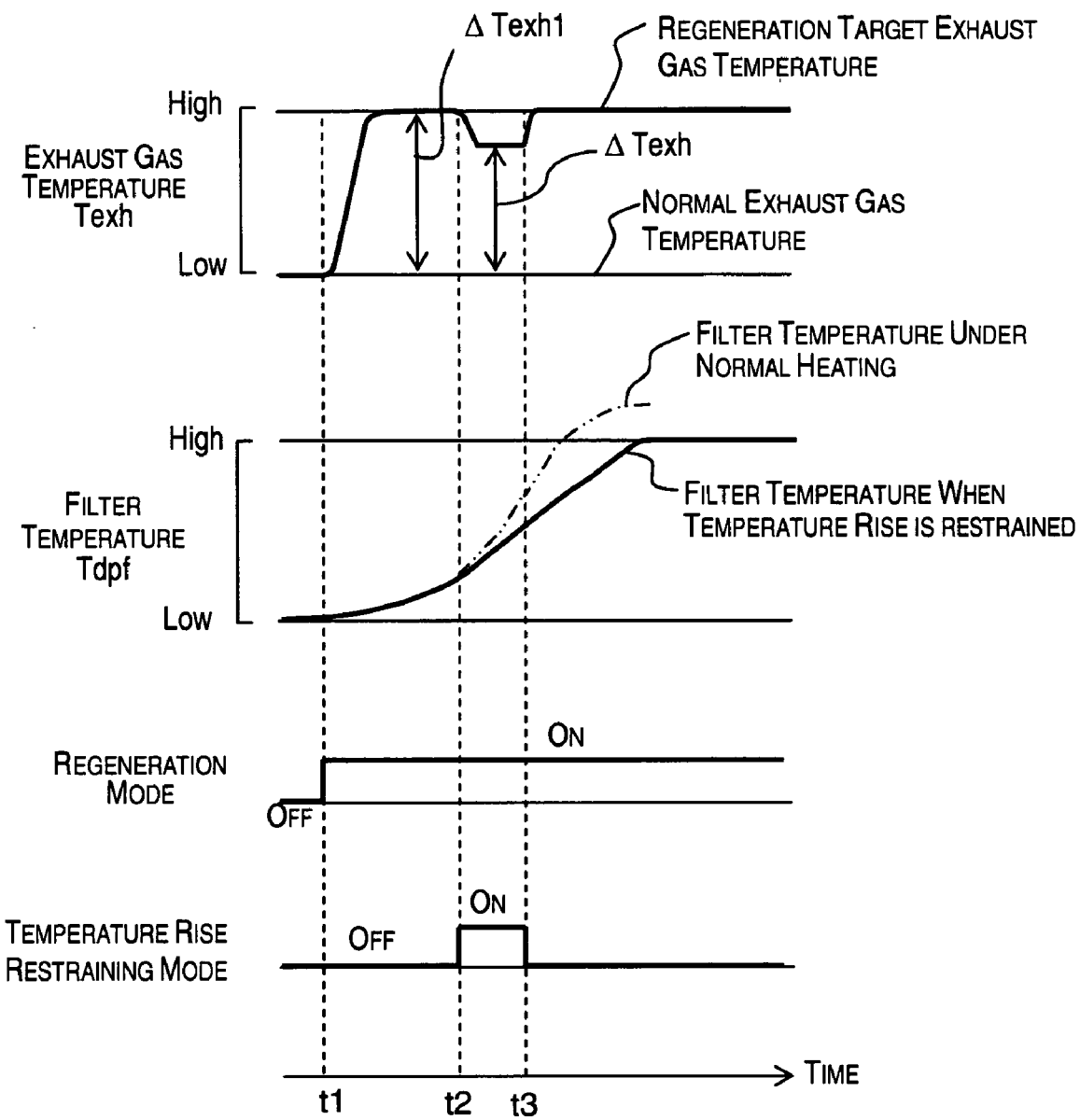
FIG. 5 shows the change in the exhaust gas temperature and the filter temperature during regeneration of the diesel particulate filter in accordance with the present invention.

This restraining operation will now be explained in detail using the time chart of FIG. 5. At time t1, the electronic control unit 21 determines that it is time to regenerate the diesel particulate filter 12 because the accumulated particulate quantity PM has reached the prescribed value PM1 (S3). An increasing/decreasing value dCONT is set with respect to the device control quantity base value CONT of regeneration control devices specified according to the operating conditions and regeneration by raising the temperature of the exhaust gas commences. The higher exhaust gas temperature causes the temperature of the diesel particulate filter 12 to rise and eventually the accumulated particulate matter begins to combust.

At time t2, the filter temperature rise rate $\Delta Tdpf$ is equal to or greater than the prescribed value $\Delta T1$. The electronic control unit 21 determines that the heating of the diesel particulate filter 12 is excessive (S8) and sets the temperature rise restraining coefficient Ktdpf (S9). For example, if the device control quantity increasing/decreasing value dCONT is set so as to retard the main injection timing, which is serving as the device control quantity base value CONT, the amount of retardation is reduced by multiplying dCONT by Ktdpf. That is, the temperature rise amount $\Delta Texh$ of the exhaust gas is reduced below the normal value $\Delta Texh1$ and the temperature rise of the diesel particulate filter 12 is restrained. If the temperature rise was not restrained, the temperature of the diesel particulate filter 12 would become excessively high, as indicated by the single-dotted chain line. Instead, by reducing the amount of temperature rise of the exhaust gas, the maximum temperature reached by the filter can be reduced and the diesel particulate filter 12 can be brought to the set temperature. The exhaust gas is returned to the normal temperature at time t3, when the filter temperature rise rate $\Delta Tdpf$ becomes less than the prescribed value $\Delta T1$.

Although in the preceding explanation the temperature of the exhaust gas was not varied after being raised during regeneration, it is preferably to vary the exhaust gas temperature in accordance with the operating conditions. In other words, the regeneration control device can be selected and the device control quantity increase/decrease value dCONT can be set in such a manner as to raise the exhaust gas temperature to a first temperature when it is possible to raise the exhaust gas to a temperature (e.g., 640° C.) where the particulates accumulated in the diesel particulate filter 12 can be combusted completely and to a second temperature when it is not possible to combust the particulates completely but it is possible to raise the exhaust gas to a temperature (e.g., 450° C.) where a quantity of particulates substantially equal to the quantity of particulates that flow into the diesel particulate filter 12 can be combusted.

Figure 6:
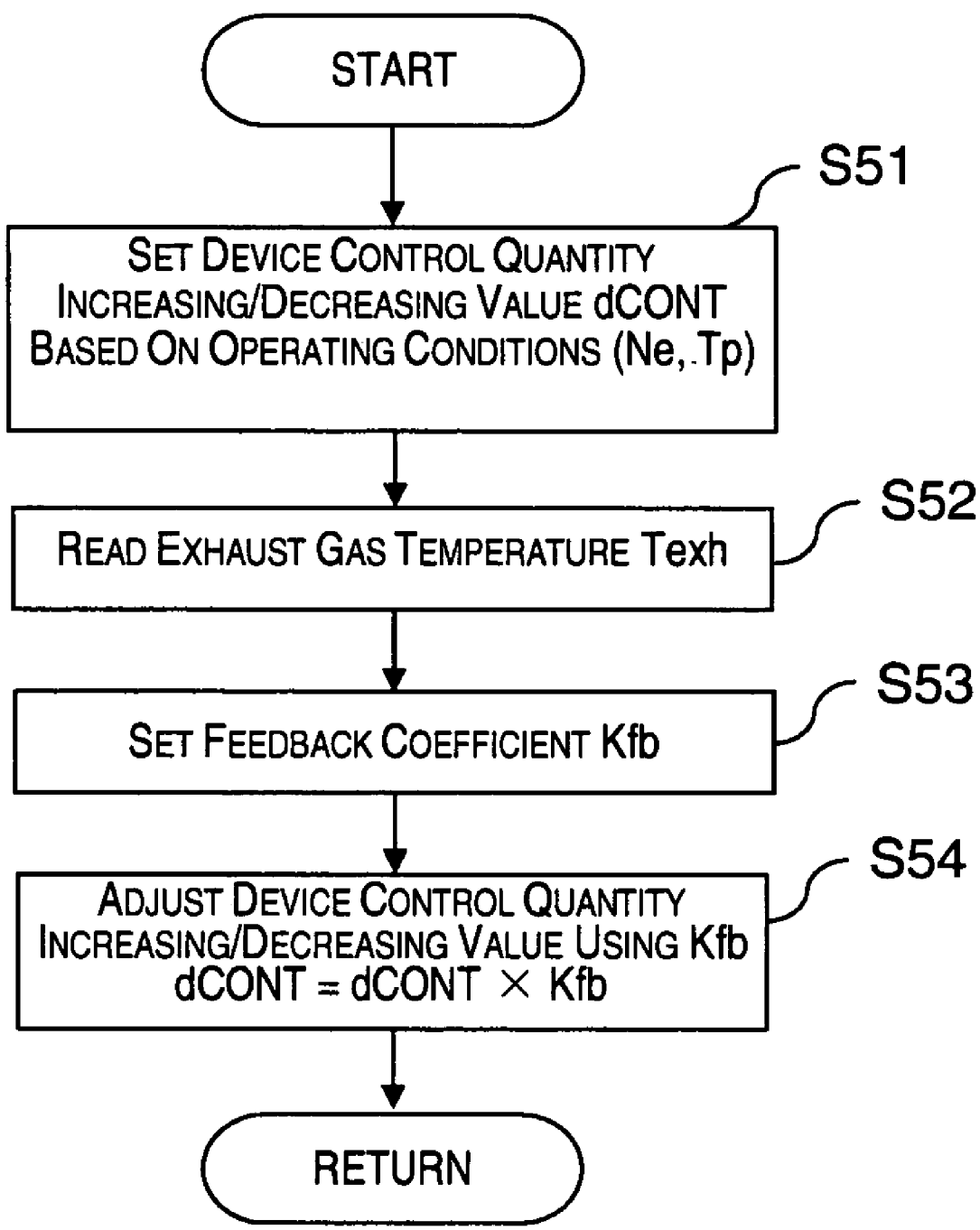
FIG. 6 is a flowchart of feedback control of the exhaust gas temperature in accordance with the present invention.

It is also good to calculate the difference between the actual exhaust gas temperature and the target exhaust gas temperature after the exhaust gas temperature has been raised during regeneration and execute feedback control in order to made the exhaust gas temperature match the target exhaust gas temperature. The flowchart of FIG. 6 is an example of such a feedback control and can be substituted for step S5 of the flowchart of FIG. 2.

Figure 7:
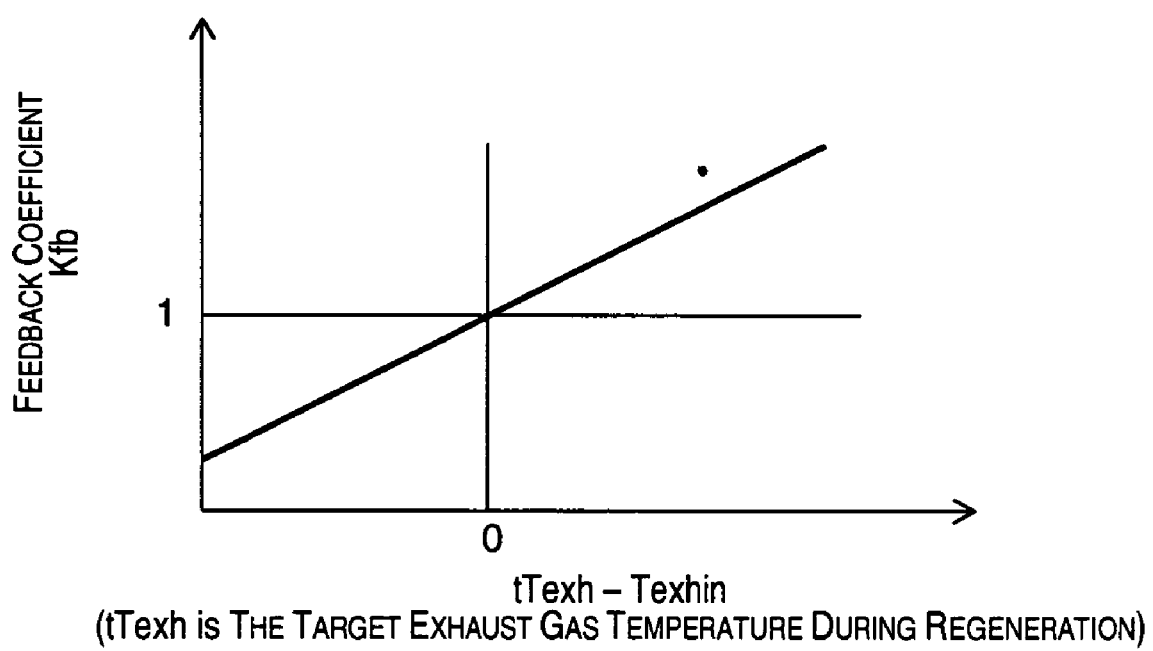
FIG. 7 shows the method of setting the feedback coefficient during the aforementioned feedback control in accordance with the present invention.

In step S51, similarly to step S5 of the flowchart shown in FIG. 2, the electronic control unit 21 sets a device control quantity increasing/decreasing value dCONT for adjusting the device control quantity base value CONT in accordance with the operating conditions. In step S52, the electronic control unit 21 reads in the exhaust gas temperature Texhin at the inlet of the filter. In step S53, the electronic control unit 21 sets a feedback coefficient Kfb in accordance with the difference between the target exhaust gas temperature tTexh and the temperature Texhin. Preferably, the electronic control unit 21 sets the target exhaust gas temperature tTexh differently depending on the operating conditions so that the exhaust gas is raised to different temperatures in accordance with the operating conditions, as described previously. The feedback coefficient Kfb is set larger values when the difference between tTexh and Texhin is larger, as shown in FIG. 7. In step S54, the device control quantity increasing/decreasing value dCONT is multiplied by Kfb to adjust dCONT (dCONT=dCONT×Kfb).

By providing the regeneration device of the diesel particulate filter 12 with this kind of feedback function, the diesel particulate filter 12 can be protected and the exhaust gas can be raised to the target temperature accurately during regeneration, thus enabling excellent combustion of the particulates.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-364375. The entire disclosure of Japanese Patent Application No. 2002-364375 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A particulate filter regenerating device comprising:
   a regeneration timing determining section configured to determine a regeneration timing to regenerate a particulate filter by combusting particulate that has accumulated in the particulate filter;
   an exhaust gas temperature increasing section configured to increase temperature of exhaust gas to regenerate the particulate filter; and
   a temperature rise restraining section configured to control at least one regeneration control device reduce a temperature rise amount of the exhaust gas caused by the exhaust gas temperature increasing section to a lower value based on a temperature of the particulate filter such that the control of the at least one regeneration control device results in at least one of
      the lower value of the temperature rise amount of the exhaust gas being less than it would be where the temperature of the particulate filter rises comparatively gradually, when the temperature of the particulate filter rises too rapidly during regeneration of the particulate filter by the exhaust gas temperature increasing section, and
      the lower value of the temperature rise amount of the exhaust gas being below a normal value that is used to bring the particulate filter to a target particulate filter temperature during regeneration.

2. The particulate filter regenerating device recited in claim 1, wherein
   the temperature rise restraining section is configured to reduce the amount of the temperature rise of the exhaust gas such that the lower value of the temperature rise amount of the exhaust gas is less than it would be where the temperature of the particulate filter rises comparatively gradually, when the temperature of the particulate filter rises too rapidly during regeneration of the particulate filter by the exhaust gas temperature increasing section.

3. The particulate filter regenerating device recited in claim 2, wherein
   the regeneration timing determining section includes
      a filter pressure difference detecting section configured to detect a pressure difference across the particulate filter,
      an exhaust gas flow rate detecting section configured to detect the exhaust gas flow rate, and
      an accumulated particulate quantity computing section configured to compute the quantity of particulate that has accumulated in the particulate filter based on the filter pressure difference detected by the filter pressure difference section and the exhaust gas flow rate detected by the exhaust gas flow rate detecting section, and
   the regeneration timing determining section is further configured to determine the regeneration timing to regenerate the particulate filter by comparing the accumulated particulate quantity computed by the accumulated particulate quantity computing section with a prescribed quantity.

4. The particulate filter regenerating device recited in claim 2, wherein
   the exhaust gas temperature increasing section includes
      an exhaust gas temperature detecting section configured to detect an exhaust gas temperature, and
      an exhaust gas temperature controlling section configured to control the exhaust gas temperature based on the exhaust gas temperature detected by the exhaust gas temperature detecting section and a target regeneration exhaust gas temperature.

5. The particulate filter regenerating device recited in claim 2, wherein
the exhaust gas temperature increasing section is further configured to increase the temperature of the exhaust gas by adjusting at least one of the following: a timing of a main fuel injection used for controlling the engine torque, a timing and quantity of a post fuel injection executed after the main fuel injection, a supercharging pressure produced by a supercharger, a flow rate of exhaust gas recirculated from the an exhaust passage to an air intake passage, and a cross sectional area of an air intake passage opening.

6. The particulate filter regenerating device recited in claim 2, wherein
the temperature rise restraining section includes
a particulate filter temperature detecting section configured to detect the temperature of the particulate filter, and
a filter temperature rise rate computing section configured to compute a filter temperature rise rate of the particulate filter detected by the particulate filter temperature detecting section, and
the temperature rise restraining section is further configured to reduce the amount of the temperature rise of the exhaust gas caused by the exhaust gas temperature increasing section when the filter temperature rise rate computed by the filter temperature rise rate computing section is greater than or equal to a prescribed value.

7. The particulate filter regenerating device recited in claim 6, wherein
the temperature rise restraining section is further configured to increase the reduction of the amount of the temperature rise of the exhaust gas caused by the exhaust gas temperature increasing section as the filter temperature rise rate computed by the filter temperature rise rate computing section becomes larger.

8. The particulate filter regenerating device recited in claim 1, wherein
the temperature rise restraining section is configured to reduce the amount of the temperature rise of the exhaust gas such that the lower value of the temperature rise amount of the exhaust gas is below a normal value that is used to bring the particulate filter to a target particulate filter temperature during regeneration.

9. The particulate filter regenerating device recited in claim 8, further comprising
a temperature detecting section configured to detect a particulate filter temperature; and the temperature rise restraining section is further configured to reduce the amount of the temperature rise of the exhaust gas caused by the exhaust gas temperature increasing section based on the particulate filter temperature detected by the temperature detecting section.

10. The particulate filter regenerating device recited in claim 8, wherein
the regeneration timing determining section includes
a filter pressure difference detecting section configured to detect a pressure difference across the particulate filter,
an exhaust gas flow rate detecting section configured to detect the exhaust gas flow rate, and
an accumulated particulate quantity computing section configured to compute the quantity of particulate that has accumulated in the particulate filter based on the filter pressure difference detected by the filter pressure difference section and the exhaust gas flow rate detected by the exhaust gas flow rate detecting section, and
the regeneration timing determining section is further configured to determine the regeneration timing to regenerate the particulate filter by comparing the accumulated particulate quantity computed by the accumulated particulate quantity computing section with a prescribed quantity.

11. The particulate filter regenerating device recited in claim 8, wherein
the exhaust gas temperature increasing section includes
an exhaust gas temperature detecting section configured to detect an exhaust gas temperature, and
an exhaust gas temperature controlling section configured to control the exhaust gas temperature based on the exhaust gas temperature detected by the exhaust gas temperature detecting section and a target regeneration exhaust gas temperature.

12. The particulate filter regenerating device recited in claim 8, wherein
the exhaust gas temperature increasing section is further configured to increase the temperature of the exhaust gas by adjusting at least one of the following: a timing of a main fuel injection used for controlling the engine torque, a timing and quantity of a post fuel injection executed after the main fuel injection, a supercharging pressure produced by a supercharger, a flow rate of exhaust gas recirculated from the an exhaust passage to an air intake passage, and a cross sectional area of an air intake passage opening.

13. The particulate filter regenerating device recited in claim 8 , wherein
the temperature rise restraining section includes
a particulate filter temperature detecting section configured to detect the temperature of the particulate filter, and
a filter temperature rise rate computing section configured to compute a filter temperature rise rate of the particulate filter detected by the particulate filter temperature detecting section, and
the temperature rise restraining section is further configured to reduce the amount of the temperature rise of the exhaust gas caused by the exhaust gas temperature increasing section when the filter temperature rise rate computed by the filter temperature rise rate computing section is greater than or equal to a prescribed value.

14. The particulate filter regenerating device recited in claim 13, wherein
the temperature rise restraining section is further configured to increase the reduction of the amount of the temperature rise of the exhaust gas caused by the exhaust gas temperature increasing section as the filter temperature rise rate computed by the filter temperature rise rate computing section becomes larger.

15. A particulate filter regenerating device comprising:
a regeneration timing determining means for determining a regeneration timing to regenerate a particulate filter by combusting particulate that has accumulated in the particulate filter;
an exhaust gas temperature increasing means for increasing temperature of exhaust gas to regenerate the particulate filter; and
a temperature rise restraining means for controlling at least one regeneration control device and for reducing a temperature rise amount of the exhaust gas caused by the exhaust gas temperature increasing means to a lower value based on a temperature of the particulate filter by the control of the at least one regeneration control device such that the control of the at least one regeneration control device results in at least one of the lower value of the temperature rise amount of the exhaust gas being less than it would be where the temperature of the particulate filter rises comparatively gradually, when the temperature of the particulate filter rises too rapidly during regeneration of the particulate filter by the exhaust gas temperature increasing section, and the lower value of the temperature rise amount of the exhaust gas being below a normal value that is used to bring the particulate filter to a target particulate filter temperature during regeneration.

16. An engine exhaust gas cleaning device, including
a particulate filter configured to be installed in an exhaust passage of an engine and configured to collect particulate matter from the exhaust gas; and
a regenerating device configured to regenerate the particulate filter, the regenerating device including
a regeneration timing determining section configured to determine a regeneration timing to regenerate a particulate filter by combusting particulate that has accumulated in the particulate filter;
an exhaust gas temperature increasing section configured to increase temperature of exhaust gas to regenerate the particulate filter; and
a temperature rise restraining section configured to control at least one regeneration control device reduce a temperature rise amount of the exhaust gas caused by the exhaust gas temperature increasing section to a lower value based on a temperature of the particulate filter by the control of the at least one regeneration control such that the control of the at least one regeneration control device at least one of the lower value of the temperature rise amount of the exhaust gas being less than it would be where the temperature of the particulate filter rises comparatively gradually, when the temperature of the particulate filter rises too rapidly during regeneration of the particulate filter by the exhaust gas temperature increasing section, and the lower value of the temperature rise amount of the exhaust gas being below a normal value that is used to bring the particulate filter to a target particulate filter temperature during regeneration.

17. The engine exhaust gas cleaning device recited in claim 16, wherein
the exhaust gas temperature increasing section is configured to raise the exhaust gas to different temperatures depending on the operating conditions, when the regenerating device regenerates the particulate filter.

18. The engine exhaust gas cleaning device recited in claim 16, wherein
the temperature rise restraining section is configured to reduce the amount of the temperature rise of the exhaust gas such that the lower value of the temperature rise amount of the exhaust gas is less than it would be where the temperature of the particulate filter rises comparatively gradually, when the temperature of the particulate filter rises too rapidly during regeneration of the particulate filter by the exhaust gas temperature increasing section.

19. The engine exhaust gas cleaning device recited in claim 16, wherein the temperature rise restraining section is configured to reduce the amount of the temperature rise of the exhaust gas such that the lower value of the temperature rise amount of the exhaust gas is below a normal value that is used to bring the particulate filter to a target particulate filter temperature during regeneration.

20. The engine exhaust gas cleaning device recited in claim 19, further comprising
a temperature detecting section configured to detect a particulate filter temperature; and the temperature rise restraining section is further configured to reduce the amount of the temperature rise of the exhaust gas caused by the exhaust gas temperature increasing section based on the particulate filter temperature detected by the temperature detecting section.

21. The engine exhaust gas cleaning device recited in claim 16, wherein
the regeneration timing determining section includes
a filter pressure difference detecting section configured to detect a pressure difference across the particulate filter,
an exhaust gas flow rate detecting section configured to detect the exhaust gas flow rate, and
an accumulated particulate quantity computing section configured to compute the quantity of particulate that has accumulated in the particulate filter based on the filter pressure difference detected by the filter pressure difference section and the exhaust gas flow rate detected by the exhaust gas flow rate detecting section, and
the regeneration timing determining section is further configured to determine the regeneration timing to regenerate the particulate filter by comparing the accumulated particulate quantity computed by the accumulated particulate quantity computing section with a prescribed quantity.

22. The engine exhaust gas cleaning device recited in claim 16, wherein
an exhaust gas temperature detecting section configured to detect an exhaust gas temperature, and
an exhaust gas temperature controlling section configured to control the exhaust gas temperature based on the exhaust gas temperature detected by the exhaust gas temperature detecting section and a target regeneration exhaust gas temperature.

23. The engine exhaust gas cleaning device recited in claim 16, wherein
the exhaust gas temperature increasing section is further configured to increase the temperature of the exhaust gas by adjusting at least one of the following: a timing of a main fuel injection used for controlling the engine torque, a timing and quantity of a post fuel injection executed after the main fuel injection, a supercharging pressure produced by a supercharger, a flow rate of exhaust gas recirculated from the an exhaust passage to an air intake passage, and a cross sectional area of an air intake passage opening.

24. The engine exhaust gas cleaning device recited in claim 16, wherein
the temperature rise restraining section includes
a particulate filter temperature detecting section configured to detect the temperature of the particulate filter, and
a filter temperature rise rate computing section configured to compute a filter temperature rise rate of the particulate filter detected by the particulate filter temperature detecting section, and the temperature rise restraining section is further configured to reduce the amount of the temperature rise of the exhaust gas caused by the exhaust gas temperature increasing section when the filter temperature rise rate computed by the filter temperature rise rate computing section is greater than or equal to a prescribed value.

25. The engine exhaust gas cleaning device recited in claim 16, wherein the temperature rise restraining section is further configured to increase the reduction of the amount of the temperature rise of the exhaust gas caused by the exhaust gas temperature increasing section as the filter temperature rise rate computed by the filter temperature rise rate computing section becomes larger.

* * * * *